Patented June 8, 1926.

1,588,052

UNITED STATES PATENT OFFICE.

RUDOLF REYHER, OF OFFENBACH-ON-THE-MAIN, GERMANY, ASSIGNOR TO CHEMISCHE FABRIK GRIESHEIM-ELEKTRON, OF FRANKFORT-ON-THE-MAIN, GERMANY, A CORPORATION.

BASIC DYESTUFFS OF THE MALACHITE-GREEN SERIES.

No Drawing. Application filed September 2, 1925, Serial No. 54,136, and in Germany September 27, 1924.

My invention relates to new basic dyestuffs of the malachite green series, corresponding in the state of the free bases probably to the general formula:

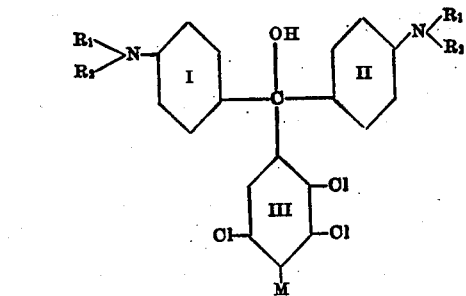

in which formula $R_1$ and $R_2$ represent monovalent radicals such as hydrogen and alkyl groups at least one of these radicals being an alkyl group, M a monovalent atom, whereas the nuclei I and II may contain further substituents.

Among the monovalent atoms, which are represented by M in the nucleus III, hydrogen and chlorine may be especially mentioned.

The new dyestuffs may be obtained by condensing one molecular proportion of a derivative of benzaldehyde having the formula:

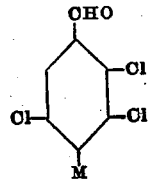

wherein M represents again a monovalent atom, with two molecular proportions of arylamins, which have monovalent radicals on the N-atom, at least one of these radicals being an alkyl group, and may contain further substituents in the nucleus, and by oxidizing the leuco bases, thus obtained, which dyestuffs are when dry bluish to green powders, soluble in water to a blue to green solution, and which dye mordanted cotton, silk and unmordanted artificial silk in beautiful and pure blue, bluish green to green shades.

The condensation of such derivatives of benzaldehyde can be executed for example with two molecular proportions of monoalkylamins, whereby after the subsequent oxidation dyestuffs are formed corresponding probably to the general formula:

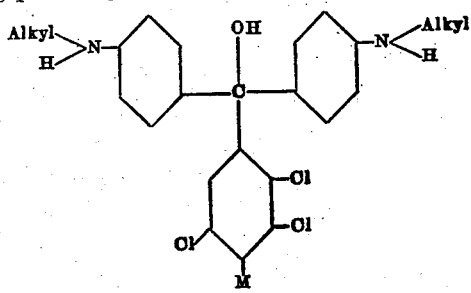

wherein M represents again a monovalent atom, the condensation can be executed also with dialkylarylamins, whereby after the subsequent oxidation dyestuffs are formed corresponding probably to the general formula:

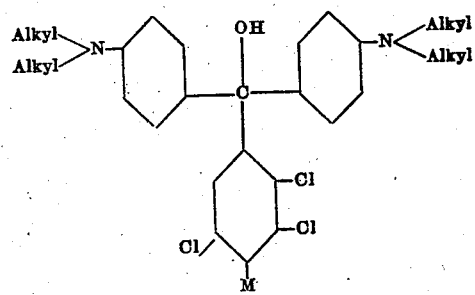

wherein M represents again a monovalent atom. If M is chlorine, dyestuffs of the following general formula are formed:

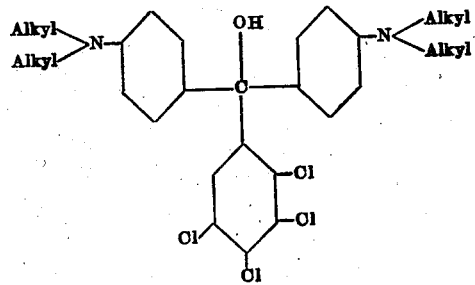

Dyestuffs of the present type, but not containing so many chlorine atoms in the positions, stated in the aforesaid formulas, were already known; the present new dyestuffs are distinguished by a great capacity of equalizing, by a surprisingly great affinity to artificial silk and by the pure tone of dyeings, obtained therewith.

The derivatives of benzaldehyde of the aforesaid formula were not known hitherto. The 2.3.5-trichlorobenzaldehyde e. g. melting at 75–76° is obtained in the ordinary way, starting from 2.3.5-trichlorotoluene, the 2.3.4.5-tetrachlorobenzaldehyde, melting at 106–106.5°, may be obtained by introducing a mixture of chlorine and air into a solution of 4-chloroacetyl-ortho-toluidin in a solvent, resistant to chlorine, by saponifying the 3.4.5-trichloroacetyl-ortho-toluidin, formed in the main, by substituting the $NH_2$ group, being in the 2-position, by chlorine according to the process of Sandmeyer, by chlorinating the 2.3.4.5-tetrachlorotoluene, thus formed, in the side chain and by saponifying the 2.3.4.5-tetrachlorobenzalchloride, thus formed. The 2.3.4.5-tetrachlorobenzaldehyde may also be obtained, starting from a mixture together with the 2.3.5.6-tetrachlorobenzaldehyde by separating the isomers according to the different solubility of their bisulfite-compounds. Such mixtures of the isomers tetrachlorobenzaldehydes can be obtained in the same way, as above mentioned for preparing pure 2.3.4.5-tetrachlorobenzaldehyde, starting from mixtures of 2.3.4.5 and 2.3.5.6-tetrachlorotoluene, which are obtained by saponifying mixtures of 3.4.5.- and 3.5.6-trichloroacidyl-ortho-toluidin and by substituting the $NH_2$- group, being in 2- position of both isomers, by chlorine according to the process of Sandmeyer. The mixtures of 3.4.5- and 3.5.6-trichloroacidyl-ortho-toluidin can be prepared starting from an acidyl-ortho-toluidin by introducing a mixture of chlorine and air in its solution in a solvent, resistant to chlorine, or in the same manner starting from a mixture of the acidyl-compounds of 4- and 6-chloro-ortho-toluidin as obtainable by chlorinating ortho-nitro-toluene according to the known process, by reducing and acidulating in a very cheap manner.

The following examples illustrate the nature of the invention, the parts being by weight.

*Example 1.*

10.5 parts of 2.3.5.-trichlorobenzaldehyde, melting at 75–76° and 14.8 parts of monoethyl-ortho-toluidin, are stirred with 9 parts of sulfuric acid of 47° Bé. at 105–110° for 30 hours. After oversaturating with a solution of carbonate of soda the excess of the base is expelled by steam, the leuco base, being solid when cold, is filtered and dried. The leuco base, thus obtained, is dissolved in 200 parts of water with 17 parts of hydrochloric acid of 22° Bé. and 3 parts of glacial acetic acid and the cold solution is oxidized by adding 31 parts of a paste, containing 49.4 p. c. of superoxide of lead, while stirring. After half an hour the lead is precipitated by 7.8 parts of sulfate of soda. After heating to 70° C. and adding such a quantity of hot water, that all the dyestuff is dissolved, the solution is filtered off and the dyestuff is salted out with common salt from the filtrate, separating in greenish opalescent spangles. The dyestuff having probably in the state of the free base the formula:

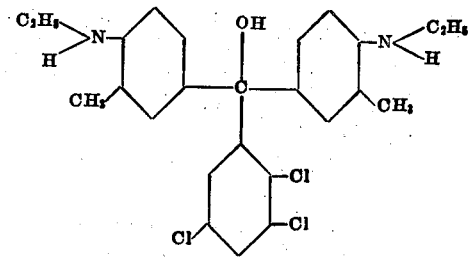

is filtered and dried. It is soluble in water to a beautiful blue solution and dyes mordanted cotton, also silk and artificial silk in pure blue shades.

*Example 2.*

12.2 parts of 2.3.4.5-tetrachlorobenzaldehyde, melting at 106–106.5° and 16.4 parts of diethylanilin are stirred with 9 parts of sulfuric acid of 47° Bé. at 110–115° for 40 hours. After oversaturating with a solution of carbonate of soda the excess of diethylanilin is expelled with steam. For oxidation the obtained 24.3 parts of the leuco base are dissolved in 200 parts of water with 17 parts of hydrochloric acid of 22° Bé. and to 3 parts of glacial acetic acid and to the cold solution I add, while stirring, 22 parts of a paste, containing 57 p. c. superoxide of lead. After about ½ hour the lead is precipitated with 7.8 parts of sulfate of soda, after moderately heating the sulfate of lead is filtered off and the green solution is salted out with common salt. The dyestuff separated is resinous, while hot, crystalline and greenish opalescent, while cold. The dyestuff, having probably in the state of the free base the formula:

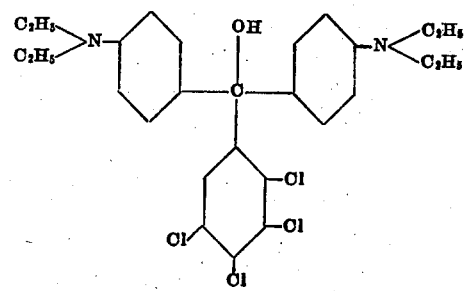

is filtered off and dried. Mordanted cotton, silk and artificial silk are dyed in very pure and even bluish green tones such as not hitherto obtainable with any one of the known unmixed dyestuffs.

In the same manner also dimethylanilin and other arylamins and other derivatives of benzaldehyde of this kind may be used for condensation.

The dyestuffs may be used also for producing color lakes.

Now what I claim is:

1. As new compounds basic dyestuffs of the malachite green series, corresponding probably in the state of the free bases to the general formula:

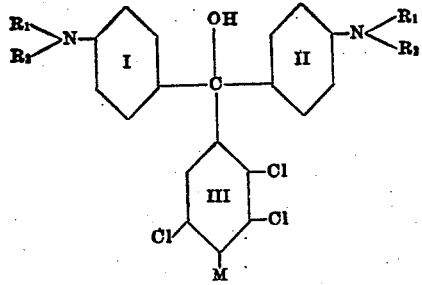

in which formula $R_1$ and $R_2$ represent monovalent radicles, at least one of these radicles being an alkyl group, M a monovalent atom, which dyestuffs may be obtained by condensing one molecular proportion of a derivative of benzaldehyde of the formula:

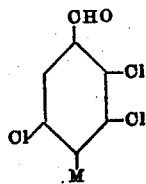

wherein M represents again a monovalent atom, with two molecular proportions of arylamins, having monovalent radicles on the N- atom, at least one of these radicles being an alkyl group, and by oxidizing the leuco bases, thus obtained, which dyestuffs are when dry bluish to green powders, soluble in water to a blue to green solution, and dye mordanted cotton, silk and unmordanted artificial silk in beautiful and pure blue, bluish green to green shades.

2. As new compounds basic dyestuffs of the malachite green series, corresponding probably in the state of free bases to the general formula:

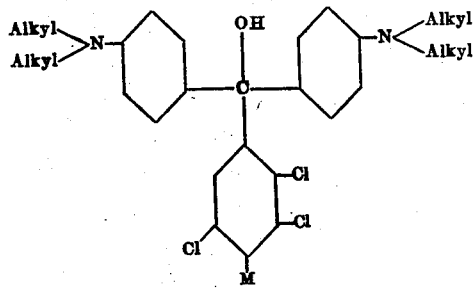

in which formula M represents a monovalent atom, which may be obtained by condensing one molecular proportion of a derivative of benzaldehyde of the formula:

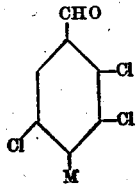

wherein M represents again a monovalent atom, with two molecular proportions of dialkylanilins and by oxidizing the leuco bases, thus obtained, which dyestuffs are when dry, bluish to green powders, soluble in water to a blue to green solution, and dye mordanted cotton, silk and unmordanted artificial silk in beautiful and pure blue, bluish green to green shades.

3. As new compounds basic dyestuffs of the malachite green series, corresponding probably in the state of the free bases to the general formula:

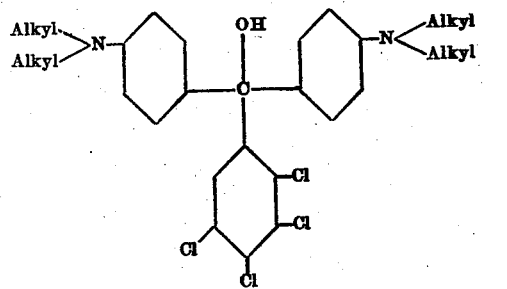

which may be obtained by condensing one molecular proportion of 2.3.4.5-tetrachlorobenzaldehyde with two molecular proportions of dialkylanilins and by oxidizing the leuco bases, thus obtained, which dyestuffs are when dry bluish to green powders, soluble in water to a blue to green solution, and dye mordanted cotton, silk and unmordanted artificial silk in beautiful and pure blue, bluish green to green shades.

4. As a new compound a basic dyestuff of the malachite green series, corresponding probably in the state of the free base to the formula:

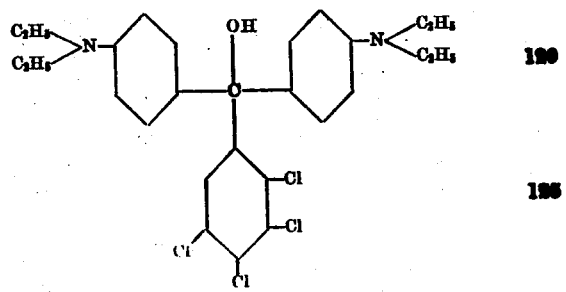

which may be obtained by condensing one molecular proportion of 2.3.4.5-tetrachlorobenzaldehyde with two molecular proportions of diethylanilin and by oxidizing the leuco base, thus obtained, which dyestuff is when dry a green powder, soluble in water to a green solution, and dyes mordanted cotton, silk and unmordanted artificial silk in beautiful and pure bluish green shades.

In testimony, that I claim the foregoing as my invention, I have signed my name, this 22d day of August, 1925.

Dr. RUDOLF REYHER.